United States Patent [19]
Hally et al.

[11] 3,964,719
[45] June 22, 1976

[54] MOBILE STONE CRUSHING PLANT

[76] Inventors: William Whytock Hally, Les-Na-Creive, Strathmore Terrace, Alyth, Perthshire; Thomas Pate, Jr., South Powrie Farm, Dundee, Angus, both of Scotland

[22] Filed: Apr. 11, 1974

[21] Appl. No.: 459,948

[30] Foreign Application Priority Data
Apr. 18, 1973 United Kingdom............... 18724/73

[52] U.S. Cl.............................. 241/101.7; 241/159; 241/223; 241/232
[51] Int. Cl.².......................................... B02C 4/08
[58] Field of Search................. 241/101.7, 159, 223, 241/232, 235, 236, 158, 157, 160, 230, 239, 241

[56] References Cited
UNITED STATES PATENTS

| | | | |
|---|---|---|---|
| 75,328 | 3/1868 | Wilson................................ 241/230 |
| 147,316 | 2/1874 | Ferguson............................ 241/230 |
| 351,616 | 10/1886 | Anderson....................... 241/235 X |
| 554,377 | 2/1896 | Roger................................. 241/230 |
| 571,266 | 11/1896 | Favrow.............................. 241/232 |
| 1,312,717 | 8/1919 | Zoeller............................... 241/159 |
| 1,462,096 | 7/1923 | Wiertz....................... 241/101.7 X |
| 1,864,973 | 6/1932 | Buchanan.......................... 241/158 |
| 1,960,836 | 5/1934 | Yender....................... 241/101.7 X |
| 2,005,758 | 6/1935 | Shiley................................ 241/232 |
| 2,200,576 | 5/1940 | Hawkins............................ 241/159 |
| 2,366,619 | 1/1945 | Harrison............................ 241/159 |
| 3,474,973 | 10/1969 | Gundlach.......................... 241/236 |
| 3,606,265 | 9/1971 | Cobey................................ 241/230 |
| R1,161 | 3/1861 | Hickok.............................. 241/235 |

Primary Examiner—Granville Y. Custer, Jr.
Attorney, Agent, or Firm—Baldwin, Wight & Brown

[57] ABSTRACT

A mobile stone crushing machine comprising a chassis on which is mounted a stone crushing unit and endless conveyor, a front end of which is adapted to collect stones from the ground as the machine is advanced over the ground, and from which the stones are continuously discharged into a stone crushing unit, characterized in that the stone crushing unit includes two crushing zones, each of which incorporates at least one crushing roller, so arranged that the stones to be crushed first pass through a nip associated with the roller at the first zone and on discharge from this nip the partially crushed stones and other matter then pass through a nip associated with the roller at the other zone. Preferably, the two crushing zones are arranged one above the other and each incorporates a pair of crushing rollers, one of which is rotatable about a fixed axis and driven and the other of which is supported upon a pair of trailing swing arms.

11 Claims, 10 Drawing Figures

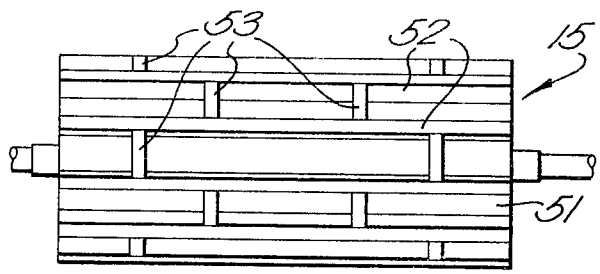
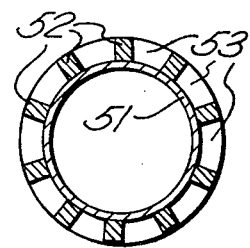
Fig.4.   Fig.4a.
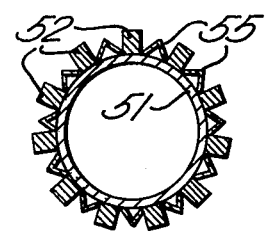
Fig.5.   Fig.5a.
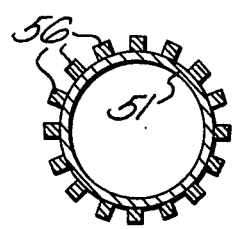
Fig.6.   Fig.6a.

MOBILE STONE CRUSHING PLANT

This invention relates to a mobile stone crushing machine intended mainly for agricultural purposes, and which will eliminate the traditional hand collection of large stones and transporting them for either crushing in a static plant or disposal by burying them in pits.

The presence of large stones on land used for root crops causes bruising and laceration of the skins, especially potatoes when harvested by mechanical means, not to mention damage to machinery, and the invention has for its object to provide a mobile crushing machine which will enable the stone size in the soil of any agricultural field to be regularised, thereby making for better growing conditions.

According to the present invention, a mobile stone crushing machine comprises a chassis on which is mounted a stone crushing unit and an endless conveyor, a front end of which is adapted to collect stones from the ground as the machine is advanced over the ground, and from which the stones are continuously discharged into the stone crushing unit, and wherein the stone crushing unit preferably includes two pairs of crushing rollers, so arranged that the stones to be crushed first pass through the nip of one of the pairs of rollers, and on discharge from this nip, the partially crushed stones and other matter then pass through the nip of the other pair of rollers. Instead of two pairs of rollers being provided, however, it is envisaged that at each crushing zone, a roller could operate in conjunction with a fixed plate. Preferably the conveyor extends upwardly and rearwardly and the first pair of rollers are superimposed above the other pair and the crushed stone therefrom is preferably deposited onto the ground. The machine may be in the form of a trailer or a self-propelled vehicle.

The stone crushing unit is preferably enclosed except for its underside in a casing or armoured shroud and side screens, the unit being adjustably suspended on the chassis to enable its distance above ground level to be varied according to operating conditions. The rollers of each pair work in contra-rotation and preferably one roller in each pair is driven, preferably the leading one, and the other and trailing roller is adjustably mounted to vary the gap between the rollers.

Preferably, each trailing roller is mounted on a pair of trailing suspension arms for free swinging movement about a horizontal axis, to allow the passage of uncrushable materials, so that the crushing forces are provided by the weight of the rollers. Preferably, spring damping means are also provided for each trailing roller.

Preferably, at least one deflector plate is associated with the upper pair of rollers to direct stones discharging from the conveyor into the nip of the rollers. This plate may be kinked and extend downwardly from the shroud to within an inch or so of the surface of the trailing roller. In order to catch stones as they are thrown upwardly by the driven roller after discharge onto it, a second horizontally disposed deflector plate located above the nip and associated with the first one, may be provided.

Preferably, the two pairs of rollers are arranged exactly one above the other, and to prevent crushed material emerging from the nip of the first pair passing directly through the nip of the second pair, a third deflector plate is provided, to catch the said material and throw it forwardly onto the driven roller of the second pair.

Provision may be made for adjusting the height of the conveyor at its collecting end and/or for a scoop to be attached thereto. In one such arrangement, the conveyor comprises a frame privotally attached at its discharge end to uprights on the chassis, its other end being adjustably supported by means of a linkage under the control of, e.g. a hydraulic ram, to enable it to be inched up and down. The conveyor may be of slatted construction so that extraneous dirt can be released and for this purpose agitators may be incorporated into the conveyor unit for separating clods of earth and smaller stones. Preferably, two endless conveyors are provided side by side, each having side screens, and a plate is provided beneath the upper arm of the upper part of each one.

A preferred embodiment of the invention is now described with reference to the accompanying schematic drawings, in which:

FIGS. 4 and 4a are respectively partly schematic front elevational and sectional views of a top driver roller of the crushing unit mechanism;

FIGS. 5, 5a, 6 and 6a are views similar to FIGS. 4 and 4a respectively of the top idler roller and the two lower driver and idler rollers.

Figure 1:
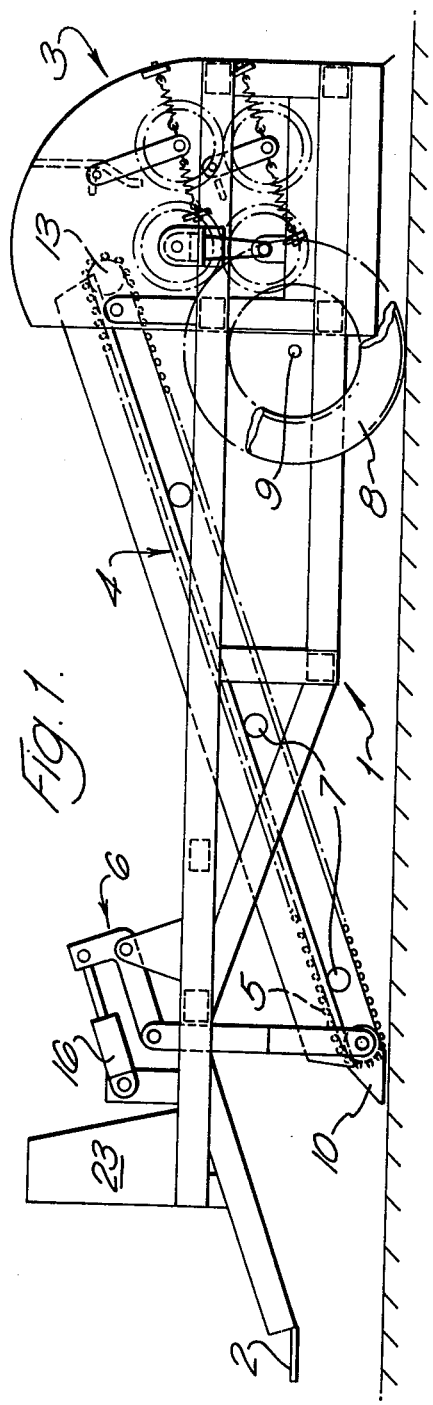
FIG. 1 is a side elevation of a mobile stone crushing machine in the form of a trailer for attachment to a tractor.
Figure 2:
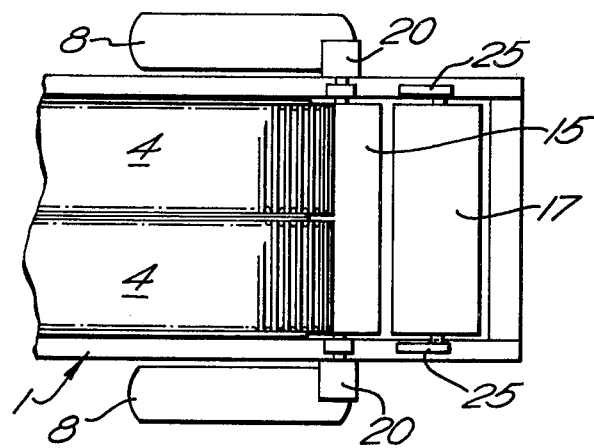
FIG. 2 is a plan view of the rear end of the machine with a shroud of the crushing unit removed.

Referring to the drawings, the machine has a chassis 1 having a towing hook 2 and mounted on drive wheels 8 supported on a suitable axle 9. At the rear end of the chassis is a brusher unit indicated generally at 3 to which stones, clods of earth and the like are fed by means of endless conveyor means 4, the conveyor means extending from a lower forward end 5 upwardly and rearwardly to its upper end which discharges into the crusher unit. At the forward end of the conveyor means 4, a scoop 10 is provided, and the front end of the conveyor means 4 can be vertically adjusted to the required depth so as to pick up all stones to that depth by means of a linkage indicated generally at 6 and a ram 16. Associated with the conveyor means 4 are a plurality of agitators 7.

The conveyor is driven by a hydraulic motor 13 powered from the hydraulic system of a tractor for pulling the machine and likewise, the ram 16 is hydraulically operated and obtains its power from the tractor hydraulic system. The mechanism of the crusher unit 3 includes two horizontally disposed pairs of crushing rollers 15, 17 and 19, 21, the roller 15 being driven by double hydraulic motors 20 and a belt drive extending from the drive for the roller 15 to the roller 19. Hydraulic power to the double hydraulic motors 20 is obtained from an auxiliary hydraulic pump mounted directly on the tractor P.T.O. shaft or driven through the P.T.O. shaft, there being a hydraulic reservoir 23 on the machine to supply hydraulic fluid to the auxiliary pump.

The crusher unit 3 will now be described more fully with reference to FIGS. 3, 4, 5 and 6 of the drawings. the fixed driven crusher roller 15 is mounted in fixed journals or bearings, but its companion roller 17 is suspended for free rotation on a pair of radial trailing suspension arms 25 pivotally supported at their upper end on the chassis 1. Suitable damping springs 27 and 29 are connected to the lower ends of the arms 25, the other ends of the respective springs being connected to the chassis 1 at suitably spaced locations 31 and 33. In a similar manner, the driven roller 19 is mounted in journals fixed on the chassis 1 whereas its companion roller 21 is again mounted on trailing suspension arms 35 supported at their upper end on the chassis 1, swinging movement of the arms 35 and their roller 21 being dampened by coil springs 37 and 39.

A kinked deflector plate 41 is suspended from the chassis 1 above the front of the roller 17 to direct stones and other debris into the nip between the rollers 15 and 17 to prevent stones and other debris from passing over the back of the roller 17, and a further horizontally disposed deflector plate 43 is provided to catch any stones or other debris thrown upwardly and rearwardly after they have fallen onto the rotating roller 15. A further deflector plate 45 is located beneath the nip of the rollers 15, 17 above the front edge of the roller 21 to catch the partially crushed stones and other matter passing through the nip, and to direct the said material forwardly onto the surface of the driven roller 19, which subsequently passes through the nip between the rollers 19 and 21.

The force needed to crush the stones passing through the nips of the two pairs of rollers is produced almost entirely by the weight of the trailing rollers 17 and 21 respectively. The springs 27 and 29 and 37 and 39 provide hardly any crushing force and merely act as dampers. It will thus be appreciated that there is no strain put on the chassis of the machine to achieve the desired crushing force and furthermore, because the rollers are mounsed on trailing suspension arms, any virtually uncrushable object can pass between the nip of both pairs of rollers because the trailing rollers 17 and 21 will merely swing rearwardly and upwardly about the points of connection of their trailing suspension arms on the chassis of the machine.

All the crushing rollers may be fabricated from mild steel.

Referring now to FIGS. 4 and 4a, the driven roller 15 has a tubular body 51 around the periphery of which are a plurality of circumferentially spaced axially extending, steel radially disposed bars 52 arranged on edge and welded to the body 51, and for a tube of approximately 13 inches diameter the bars are approximately 2 inches × ¾ inch. Between each adjacent bar there are at least two segmental strengthening ribs 53, these ribs being staggered as indicated in FIG. 4. The body 51 has suitable end plates and is supported on a central shaft. The trailing idler roller 17 shown in FIGS. 5 and 5a again has a tubular body 51 and a plurality of bars identical to the bars 52. Between each of the bars 52 on the roller 17 a 2 inch × 2 inch × ¼ inch angle iron 55 is provided in place of the segmental ribs 53, the edges of the angle iron being welded to the body 51 so that the apex of the angle iron projects outwardly.

Both the rollers 19 and 21 of the lower pair of rollers are similar and are illustrated in FIG. 6. Each of these rollers has a tubular body 51 and circumferentially spaced around the body are a plurality of 1 inch square steel bars 56 welded to the body.

The whole crusher unit is enclosed within an armour plated shroud 57 which may be surrounded with sound deadening material such as a plastics foam which may have an outer metallic cover. Suitable access hatches may be provided in the shroud and if these are provided, a suitable fail-safe mechanism is preferably associated with each so that, in the event of one of the hatches being open, it is impossible for the crusher unit to be operated. Depending from the lower edge of the shroud 57 is a heavy rubber or plastics skirt guard 58 to prevent crushed stones from flying out from beneath the shroud. Normally, the crushed stones will merely fall onto the ground beneath the crusher unit inside the shroud, but it will be appreciated that a crushed stone can have considerable energy and could fly inadvertently in any direction. The shroud and skirt are therefore very important for safety reasons.

To operate the machine, the tractor driver decides to what depth he wishes to excavate the ground and sets the depth of the scoop 10 with the hydraulic cylinder 16. He then sets in motion the conveyor 4 and the agitator 7 and engages the tractor P.T.O. shaft to operate the hydraulic motors 13 and set the crusher unit in operation. On driving the tractor forward, the ground will be excavated to the required depth and will be conveyed up the conveyor 4. The conveyor is preferably comprised of two separate endless conveyors side by side and of standard slatted construction, there being a plate immediately beneath the last two-thirds or so of the upper run. Due to the vibration imparted to the conveyor by the agitators 7 and the passage of the machine over the ground, loose soil and fine gravel will pass between the slats of the conveyor and only large stones and clods will be conveyed up the conveyor, through a suitable flexible screen and into the crusher unit whereupon they will be deposited on the upper surface of the driven roller 15. The stones will then either fall into the nip between the rollers 15 and 17 or alternatively will be driven upwardly against one of the deflector plates 41 or 43 and will then fall into the nip. There they will receive a first crushing and will then fall onto the deflector plate 45 from which they will then fall forwardly onto the driven roller 19, whence they will pass into the nip of the second pair of rollers where they will be crushed again and will then fall as finely crushed stone or gravel or dust onto the ground.

It was found in a test run that the machine in one pass crushed 30 stones weighing 55 kilograms into 5.8 kilograms of stone or 1¼ inches or larger, 35.6 kilograms of stone sized between 1¼ inches and 5/16 inch, 12.5 kilograms of stone under 5/16 inch and the remaining 1.1 kilograms was lost as dust.

It is envisaged that the machine could be self-propelled and that the trailing crushing rollers, instead of being supported on suspension arms, could be mounted in suitable guides; furthermore, springs could be used to provide a crushing force.

The above described machine is easy to operate, can be handled by a medium sized tractor and has a weight ratio/ground pressure no greater than that of a standard tractor. It has a minimum number of movable parts, is very maneuverable and the construction of the crusher unit with its trailing pivotally mounted rollers relying upon their own weight to perform the crushing operation can deal with clods of earth and other rubbish without trouble. Furthermore, it has been found that by dividing the conveyor into two parallel runs, the slats are not so liable to bend, and when used on the slopes, the stones on the conveyors do not all fall to one side. The machine can cover an acre of ground an hour leaving the soil in perfect condition for crops and especially root crops. Because of the uniform distribution of crushed stone, the soil has a uniform moisture content leading to a more uniform crop and, furthermore, the soil is less likely to compact and the crushed stones absorb sunlight uniformly thereby tending slightly to raise the temperature of the ground uniformly throughout.

Because there are no large stones in the soil, harvesting of the crop is facilitated and there is less damage to machinery and crops than is the case with untreated ground.

It will be appreciated that the construction of the above described stone crushing machine is such that it can handle soil and rubbish as well as a large variety of stones, irrespective of the soil moisture content. If desired, the precise construction of the crushing drums can be altered to suit the type of stone being crushed and instead of having longitudinally extending bars on their surface, the bars may extend helically after the fashion of a grass mower and their height, width and pitch may be varied. The quantity of crushing drums may be increased to suit the desired quality of crushed stone throughput, their diameters may be changed and instead of having bars, they may be laterally or longitudinally serrated or even provided with replaceable studs. The rotational speed of the crushing drums may be varied to suit local conditions and instead of driving the drums with hydraulic motors, different drive means may be provided. It is even envisaged that the idler drums 17 and 21 could be driven for particularly difficult applications, such as in heavy wet clay soils which tend to form a heavy paste and consequently clog the idler drums.

It is envisaged that in a modified construction the complete crushing drum assembly and its power unit or units and transmission may detachable from the chassis 1, thus allowing a transverse conveyor complete with power unit to be fitted so that the machine could be used for potato or other root crop harvesting or grading. Obviously, if such a modification was made, the front end of the conveyor means 4 would have to be modified somewhat to lift the root crop. In this respect, a rotary cultivator complete with its own power unit could be fitted to the front of the conveyor means 4 and controlled from the tractor, thus assisting in the breaking up of hard ground. The rotary cultivator could be an accessory for the crushing machine which could be fitted to the machine by its purchaser. In its simplest form the rotary cultivator could be in the form of a driven spiked roller.

It is envisaged that the double conveyor means illustrated in the drawings could be of any other known construction.

Figure 7:
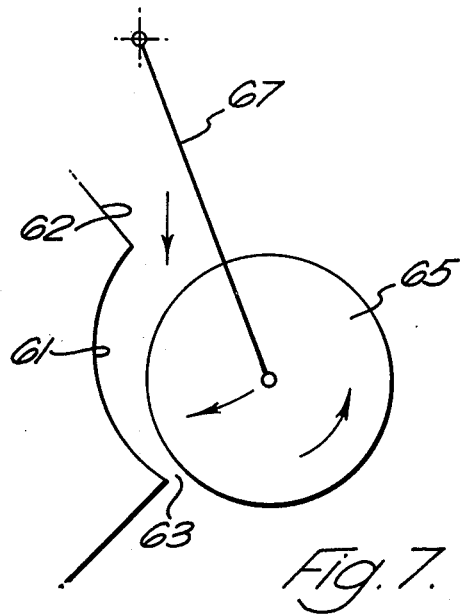
FIG. 7 is a schematic elevation of an alternative crushing mechanism.
Figure 3:
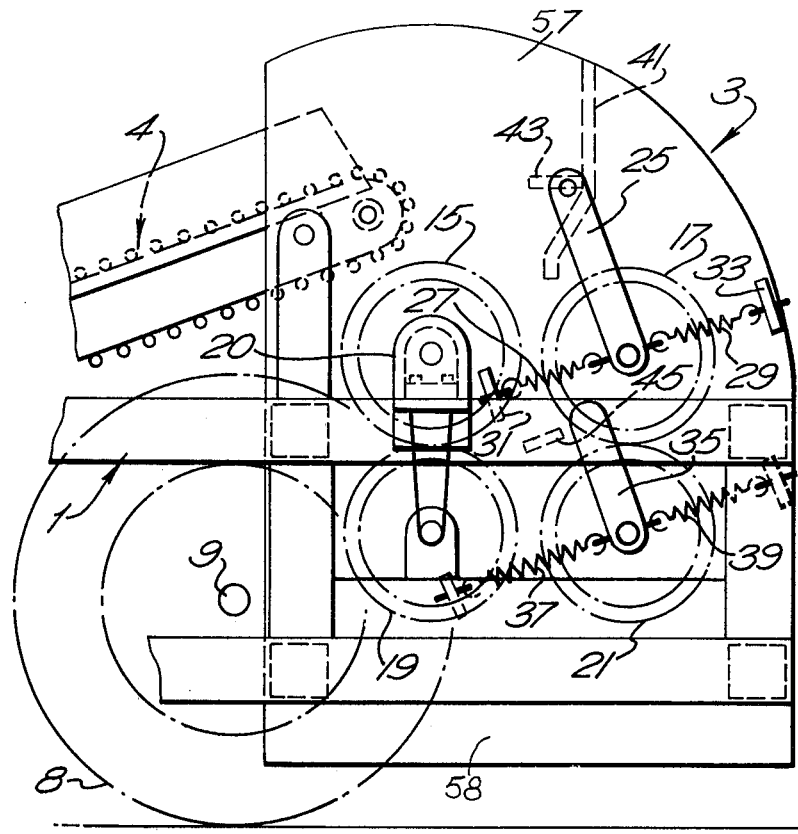
FIG. 3 is an enlarged elevation of the crushing unit.

Although it is preferred that a pair of rollers be provided at each crushing zone, it is envisaged that one of the rollers at each zone could be replaced by a plate 61 as shown in FIG. 7. This plate 61 has an inclined top 62 and is preferaably concave, and fixed, to give a crushing passage or nip 63 of diminishing width and the surface of the plate may be provided with suitable crushing bars, spikes, serrations or the like. With such an arrangement, it is preferred that a leading roller be dispensed with, in which case, the illustrated trailing roller should preferably be mounted on a pair of trailing arms 67, to allow passage of large stones. It is envisaged, however, that the plate 61 could be so mounted. When a plate 61 is provided, it will be necessary to drive the roller 65, e.g. with a double hydraulic motor.

In a further alternative construction, it is envisaged that the crusher construction shown in FIG. 7, instead of replacing one or both pairs of crusher rollers, may be complementary to them.

What is claimed is:

1. A stone crushing unit comprising two crushing zones one above the other with at least one crushing roller at each crushing zone and further crushing means at each zone co-operating with the respective roller to define at each zone a nip through which stones pass for crushing, mounting means mounting each of said rollers for positioning said rollers relative to their respective co-operating crushing means by the force of gravity directly onto said rollers, said mounting means allowing passage of uncrushable material through each of said nips through the movement of the respective roller against the force of gravity, and spring dampening means associated with each crushing roller for dampening movement of each crushing roller towards and away from its cooperating crushing means.

2. A stone crushing unit as claimed in claim 1 together with an armoured shroud generally enclosing said crushing unit except for its underside and a flexible skirt guard extending from the lower edge of the casing towards the ground.

3. A stone crushing unit as claimed in claim 1 wherein said mounting means includes a pair of trailing suspension arms capable of free swinging movement about a horizontal axis adjustably mounting the respective roller at each zone.

4. A stone crushing unit as claimed in claim 1 together with an armoured shroud generally enclosing said crushing unit, and wherein a kinked deflector plate extends downwardly from a top portion of said armoured shroud to a point adjacent the surface of said roller in said first crushing zone.

5. A stone crushing unit as in claim inclaim 1 including a horizontally disposed deflector plate located above the nip at the first crushing zone to deflect downwardly stones thrown upwardly therefrom.

6. A stone crushing unit as claimed in claim 1 wherein at one of said crushing zones said further crushing means is another roller and said nip is defined by said pair of rollers, said other roller being a leading roller means mounting said other roller for rotation about a fixed axis, and drive means for rotating at least said leading roller with said rollers rotating in opposite directions in use.

7. A stone crushing unit as claimed in claim 1 wherein at both of said crushing zones said further crushing means is another roller and each nip is defined by said pair of rollers, said other roller of each zone being a leading roller being mounted for rotation about a fixed axis and drive means for rotating at least each leading roller, said rollers at each zone rotating in opposite directions in use.

8. A stone crushing unit as claimed in claim 7 wherein said other roller of a first of said zones is formed of steel and includes a cylindrical body provided with axially extending radially disposed bars circumferentially spaced on its periphery and embraced by axially spaced segmental ribs, and both the rollers of a second of said zones are formed of steel and include a cylindrical body having on its periphery a plurality of radially disposed axially extending circumferentially spaced bars which are smaller than those on said other roller of said first zone.

9. A stone crashing unit as claimed in claim 7 wherein said other roller of a first of said zones is formed of steel and includes a cylindrical body provided with axially extending radially disposed bars circumferentially spaced on its periphery and embraced by axially spaced segmental ribs, and the first-mentioned roller at said first zone is formed of steel and has a cylindrical body provided with axially extending radially disposed circumferentially spaced bars on its periphery between which are located axially extending inverted V-shaped angle irons.

10. A stone crushing unit as claimed in claim 1 wherein the first-mentioned roller at said first zone is formed of steel and has a cylindrical body provided with axially extending radially disposed circumferentially spaced bars on its periphery between which are located axially extending inverted V-shaped angle irons.

11. A stone crushing unit as defined in claim 1 wherein there is a mobile chassis, an endless conveyor is mounted on said chassis and has a lower forward end for collecting stones and an upper rear end, said crushing unit being mounted on said chassis for receiving stones from said conveyor upper and into an upper one of said crushing zones, said chassis has means for mounting said crushing means of said two zones, and there is an armored shroud encasing said brushing zones and separately mounted on said chassis.

* * * * *